June 10, 1930.                L. ROMERO                1,763,445
                        TORTILLA FORMING MACHINE
                          Filed Dec. 15, 1927
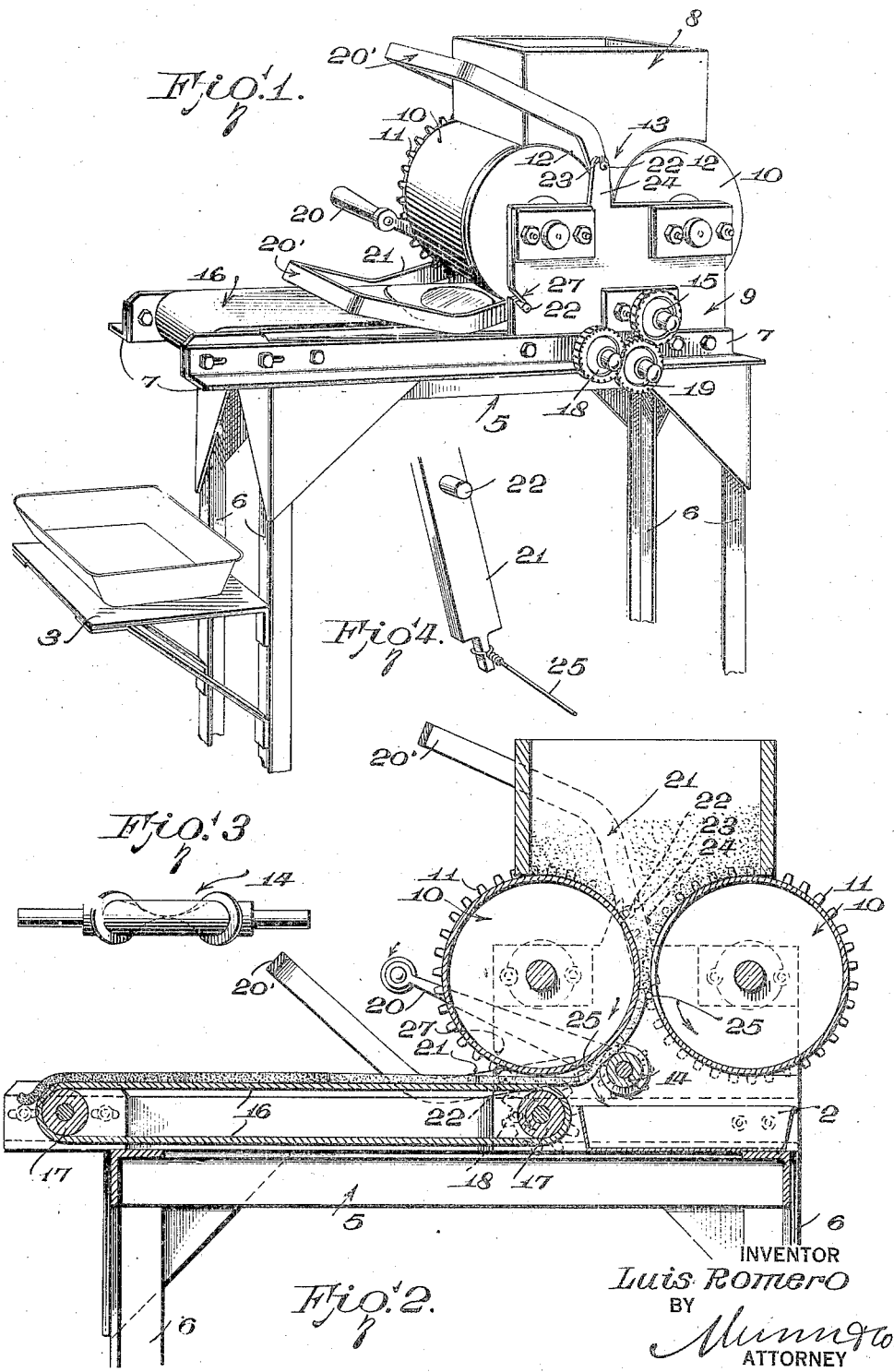
INVENTOR
Luis Romero
BY
ATTORNEY Patented June 10, 1930

1,763,445

UNITED STATES PATENT OFFICE

LUIS ROMERO, OF MEXICO CITY, MEXICO

TORTILLA-FORMING MACHINE

Application filed December 15, 1927. Serial No. 240,229.

My invention relates to cake forming machines and has as one of its objects the provision of a machine of this character wherein dough from which the cakes are formed is first flattened out, the cakes stamped or cut therefrom, and conveyed to a suitable receptacle.

The invention further provides a cake forming machine embodying a pair of coacting dough pressing rollers having means for detaching the dough from one roller and subsequently detach the cut or stamped cakes form the other roller.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a perspective of the invention;

Figure 2 is a vertical sectional view of the same;

Figure 3 is a detail view of the cake cutting element embodied in the invention; and Figure 4 is a perspective of one of the dough detaching members embodied in the invention.

Referring to the invention in detail a table 5 is provided embodying legs 6 and horizontally disposed spaced parallel angle rails 7.

A dough receiving hopper 8 is arranged above the table 5 at one end thereof and supported from vertically extending parallel plates 9 attached to the angle bars 7.

Disposed beneath the hopper and journalled in the vertical plates is a pair of pressure rollers 10 of such diameter as to project beyond the end walls of the hopper, the rollers being equipped with intermeshing gear teeth 11 whereby they are caused to rotate in opposite directions to feed the dough from the hopper in a longitudinal strip.

As illustrated in Figure 1 the lower edges of the hopper lie close to the periphery of the rollers and for this purpose the side walls of the hopper are cut out from their opposite ends on semi-circular lines 12, leaving depending V-shaped extensions 13 which project between the ends of the pressure rollers.

A cake forming roller 14 is journalled in the vertical plates in close proximity to the forward pressure roller beneath the latter and carries a bevelled gear 15 upon one end thereof, the latter being disposed exteriorly of the adjacent vertical plate. Formed on this roller is a laterally extending dough cutting blade which is substantially 8 shaped in plan. That is, the blade extends longitudinally of the roller, is formed with circular end portions and a restricted intermediate portion so that upon each revolution of the roller the blade will cut a circular cake from the sheet of dough as it is fed forwardly between the pressure rollers. Any severed dough particles fall into a pan 2 removably arranged on the table beneath the cake forming roller.

In order to convey the cakes forwardly after the cake forming operation, an endless belt 16 extends horizontally between the angle rails from the forward end of the latter to a point below the forward pressure roller. This endless belt passes around rollers 17, one of which is provided with a bevelled gear 18 meshing with an idler gear 19 journalled upon one of the angle bars and engaging the gear 15. A crank handle 20 is fixed to one end of the cake forming roller to rotate the latter and at the same time drive the pressure rollers and advance the dough in a longitudinal strip or sheet between the same. A horizontal pan supporting bracket 3 is supported by the forward legs of the table to support a pan or other suitable receptacle in position to receive the cakes as they are conveyed forwardly by the endless belt.

As the dough is pressed or squeezed between the pressure rollers, it will naturally adhere to the surface of both. To detach the dough from the periphery of the rear pressure roller, means is provided comprising a U-shaped frame 20' embracing the side walls of the hopper. This U-shaped frame is formed with obliquely disposed extremities 21 having laterally disposed pintles 22 which are pivotally received in slots 23 of upstanding bearing arms 24 on the upper edges of the plates between the rollers. The extremities 21 extend downwardly between the ends of the rollers and the plates and carry a scraper wire 25 which extends longitudinally of the rollers below the hopper. As illustrated in Figure 4 the pintles are disposed off center of the frame whereby to swing the latter downwardly to cause the scraper wire to contact with the periphery of the rear pressure roller where it will engage beneath the dough to detach it from this roller.

To detach the formed cakes, and dough strip from which they are cut, from the forward pressure roller, an identical dough detaching means is provided. In this instance the frame is pivoted in slotted bearing arms 27 projecting forward from the vertical plates and is normally retained in a position where its scraper wire contacts with the periphery of the roller at a point slightly above the endless belt. It will be observed that both U-shaped frames are detachably supported so that they can be removed for the purpose of cleaning or repairing the scraper wires.

What is claimed is:—

1. In combination a hopper for receiving a body of plastic material, a pair of coacting pressure rollers journalled below the same adapted to advance plastic material in a longitudinal sheet, a U-shaped frame pivoted off dead center to the hopper, a flexible scraper element carried by the frame and normally held against one of the rollers to detach the plastic material therefrom.

2. In combination a horizontal support, a dough receiving hopper supported above the same, a pair of coacting pressure rollers journalled below the hopper for forming the dough in a longitudinal sheet, U-shaped frames, means pivotally supporting the frames off center to swing about horizontal axes and normally tending to swing downwardly, a flexible element attached to each frame and engaging the rollers, one of the flexible elements serving to detach the dough from one roller and the other being subsequently operable to detach the dough from the other roller.

3. In combination, a support, a pair of coacting pressure rollers rotatably supported thereon and between which dough is formed in a longitudinal sheet, U-shaped frames, means to which said frames are horizontally pivotally supported off center, a flexible element attached to each frame and engaging one of the rollers, one of the flexible elements serving to detach the dough sheet from one roller, and the other being subsequently operable to detach the dough from the other roller.

Signed at Mexico City in the Federal District, Republic of Mexico, this 22d day of November, A. D. 1927.

LUIS ROMERO.